(12) United States Patent
Ichikawa (10) Patent No.: US 7,601,195 B2
(45) Date of Patent: Oct. 13, 2009

(54) HONEYCOMB STRUCTURE AND METHOD OF MANUFACTURING THE SAME

(75) Inventor: Yukihito Ichikawa, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 5 days.

(21) Appl. No.: 11/889,291

(22) Filed: Aug. 10, 2007

(65) Prior Publication Data

US 2007/0294989 A1    Dec. 27, 2007

Related U.S. Application Data

(63) Continuation of application No. PCT/JP2006/305348, filed on Mar. 17, 2006.

(30) Foreign Application Priority Data

Mar. 22, 2005    (JP)    ............... 2005-081330

(51) Int. Cl.
- *B01D 39/00* (2006.01)
- *B01D 39/20* (2006.01)
- *B01D 39/14* (2006.01)
- *B32B 3/02* (2006.01)
- *B32B 3/12* (2006.01)
- *B28B 1/00* (2006.01)
- *B01J 21/04* (2006.01)

(52) U.S. Cl. ............... 55/523; 55/522; 55/524; 428/115; 428/116; 428/117; 428/118; 264/630; 502/439

(58) Field of Classification Search ........... 55/522–524; 502/439; 264/630; 428/115–118
See application file for complete search history.

(56) References Cited

U.S. PATENT DOCUMENTS

| | | | |
|---|---|---|---|
| 3,853,485 A | 12/1974 | Hogan | |
| 4,276,071 A * | 6/1981 | Outland | ............... 428/116 |
| 4,323,614 A | 4/1982 | Gulati | |
| 4,915,612 A | 4/1990 | Gangeme et al. | |
| 5,633,066 A | 5/1997 | Lipp et al. | |
| 5,846,276 A * | 12/1998 | Nagai et al. | ............... 55/523 |
| 6,652,257 B2 | 11/2003 | Yamaguchi et al. | |
| 2004/0128991 A1* | 7/2004 | Sakamoto | ............... 60/299 |

FOREIGN PATENT DOCUMENTS

| JP | A 55-155742 | 12/1980 |
|---|---|---|
| JP | A 59-47310 | 3/1984 |
| JP | U-59-047310 | 3/1984 |
| JP | B2-59-53176 | 12/1984 |
| JP | A 60-145216 | 7/1985 |
| JP | U-60-145216 | 9/1985 |
| JP | A 2-245313 | 10/1990 |
| JP | A-2-255576 | 10/1990 |
| JP | A 9-290413 | 11/1997 |
| JP | A-10-315213 | 12/1998 |
| JP | A 2001-260116 | 9/2001 |
| JP | A 2003-181527 | 7/2003 |

* cited by examiner

*Primary Examiner*—Walter D Griffin
*Assistant Examiner*—Amber Orlando
(74) *Attorney, Agent, or Firm*—Oliff & Berridge, PLC (57) ABSTRACT

There is provided a honeycomb structure having a consecutive cell structure and capable of reconciling reduction in pressure loss and improvement in purification ability and a method for manufacturing the honeycomb structure. The honeycomb structure 1 has a plurality of partition walls 2 partitioning a plurality of cells 3 extending in an axial direction. At least a part of continuous partition walls 2 has a curved shape protruding toward outside from the center 4 of a cross-section perpendicular to the axial direction or a curved shape protruding toward the center of the cross-section from outside.

14 Claims, 5 Drawing Sheets

HONEYCOMB STRUCTURE AND METHOD OF MANUFACTURING THE SAME

This is a Continuation of International Application No. PCT/JP2006/305348 filed Mar. 17, 2006, which claims the benefit of Japanese Application No. 2005-081330 filed Mar. 22, 2005. The disclosure of the prior applications is hereby incorporated by reference herein in its entirety.

FIELD OF THE INVENTION

The present invention relates to a honeycomb structure capable of being used as a catalyst carrier for purifying exhaust gas from various internal combustion engines, a catalyst carrier for deodorizing, a filter for various filtration apparatuses, a heat exchanger unit, or a carrier for a chemical reactor such as a reforming catalyst carrier for a fuel cell.

BACKGROUND OF THE INVENTION

A honeycomb structure is widely known as a catalyst carrier for purifying exhaust gas discharged from various internal combustion engines, such as automobile exhaust gas, or a catalyst carrier for deodorizing. In such a honeycomb structure, partition walls partitioning cells have generally been formed linearly over the whole honeycomb structure conventionally in the case of being used for a catalyst for purifying automobile exhaust gas.

On the other hand, in recent years, according to strengthening of an exhaust gas regulation with environmental problems as its background, great importance has been placed on purification ability regarding an automobile gas purification catalyst. Therefore, development of engines for reducing a discharge amount of harmful matter such as hydrocarbons (HC), carbon monoxide (CO), and nitrogen oxide (NOx) and improvement of three way catalysts for a gasoline engine, which is the main current at present, are making progress, and a discharge amount of harmful matter tends to decrease due to effects by both of them.

Thus, an exhaust amount as a whole upon engine operation has been reduced. On the other hand, an amount of harmful matter discharged right after engine start-up has been highlighted. For example, in a FTP-75 cycle, which is a U.S. regulated traveling cycle, 60 to 80% of the total discharge amount in the whole traveling cycle is discharged in a cold-transient mode for 140 seconds right after engine start-up.

One of the reasons is that the catalyst is not activated sufficiently because temperature of exhaust gas is low particularly right after engine start up, and, as a result, harmful matter passes the catalyst without being removed. In addition, another reason is that since combustion conditions of fuel is not stable right after engine start-up, A/F (an air/fuel ratio) of exhaust gas, which is an important factor influencing purification performance of a three way catalyst, that is, an oxygen ratio in exhaust gas fluctuates.

Therefore, a catalyst is disposed as close to the engine as possible in a place where exhaust gas temperature is high in order to quickly raise temperature of a catalyst right after engine start-up, or a cell partition wall is thinned in order to lower a heat capacity of the honeycomb carrier itself. In addition, a cell density of the carrier is increased in order to quickly absorb heat of exhaust gas and enlarge a contact area of the catalyst and exhaust gas. There is a problem of increase in pressure loss due to increase in cell density. Further, in the case that an amount of catalyst to be loaded is increased in order to enhance purification ability, it requires a large amount of platinum, which is an expensive catalyst component, or the like, and results in not only increase in cost but also increase in pressure loss because a width of a cell, where exhaust gas actually passes, becomes narrower.

Recently, improvement in mileage has further been required because of the problem of global warming by $CO_2$, and to reduce a pressure loss of a honeycomb structure is more strictly required than before. Therefore, achieving both improvement in purification ability and reduction in pressure loss is desired. In addition, in recent years, a diesel engine is appreciated again because of its low mileage. However, a diesel engine discharges far more particulate matter than a gasoline engine and has a characteristic of trade-off that nitrogen oxide (NOx) increases when the engine is controlled so as to reduce a PM discharge amount. In addition, there arises a problem that nitrogen oxide (NOx) cannot be subjected to a reduction treatment because the exhaust gas has such a high oxygen content that a three way catalyst cannot function as the case of exhaust gas from a gasoline engine. Therefore, a filter using a honeycomb structure is used for removing particulate matter in diesel exhaust gas. However, there arises a problem that a pressure loss becomes high because it has a structure where cell openings are alternately plugged and particulate matter is trapped by the filter partition walls.

On the other hand, it is disclosed to plan uniformalization of exhaust gas flow by changing cell density between the central portion and the outer peripheral portion of a honeycomb structure (see, for example, Patent Documents 1 to 3). For example, Patent Document 1 discloses uniformalization of exhaust gas flow by raising cell density in the central portion. However, there is an apprehension of reduction in thermal shock resistance since there is a discontinuation in a cell structure at a boundary between a portion having high cell density and a portion having low cell density. In addition, a special extrusion die is necessary to prepare such a structure by extrusion forming.

Patent Document 1: U.S. Pat. No. 3853485
Patent Document 2: JP-U-145216
Patent Document 3: JP-U-47310

DISCLOSURE OF THE INVENTION

According to the present invention, there is provided a honeycomb structure capable of achieving both reduction in pressure loss and improvement in purification ability. According to the present invention, there is also provided a method for manufacturing a honeycomb structure capable of forming such a honeycomb structure by extrusion with a conventional extrusion die without requiring a special processing for the extrusion die.

According to the present invention, there are provided the following honeycomb structure and a method for manufacturing the honeycomb structure.

[1] A honeycomb structure having a plurality of partition walls partitioning a plurality of cells extending in an axial direction, wherein at least a part of consecutive partition walls has a curved shape protruding toward outside from the center of a cross-section perpendicular to the axial direction.

[2] A honeycomb structure having a plurality of partition walls partitioning a plurality of cells extending in an axial direction, wherein at least a part of consecutive partition walls has a curved shape protruding toward the center of a cross-section perpendicular to the axial direction from outside.

[3] A honeycomb structure according to [1] or [2], wherein the partition walls each has an average curvature Wav (mm) of $0.6 \leq Wav \leq 15$.

[4] A honeycomb structure according to any one of [1] to [3], wherein a relation between the Wav (mm) and a cell pitch P (mm) is $1.2 \leq (Wav/P) \leq 5$.

[5] A method for manufacturing a honeycomb structure, comprising a step of forming a honeycomb formed body having partition walls partitioning a plurality of cells extending in an axial direction by extrusion-forming, wherein extrusion-forming is performed at different extrusion speed between in a central portion and in an outer peripheral portion to form partition walls each having a curved shape in a cross-section perpendicular to the axial direction.

According to a honeycomb structure of the present invention, cell density can smoothly be changed sequentially from the central portion to the outer peripheral portion. Therefore, cell density in the central portion can appropriately be made larger than that in the outer peripheral portion in accordance with usage, important characteristics, and other structural factors (cell density, partition wall thickness, etc.), or be made in reverse structure, and other structural factors (cell density, partition wall thickness, etc.), and both reduction in pressure loss and improvement in purification ability can be achieved.

BRIEF DESCRIPTION OF DRAWINGS

FIGS. 1(a) and 1(b) are views schematically showing the first embodiment of a honeycomb structure of the present invention.

DESCRIPTION OF REFERENCE NUMERALS

1: honeycomb structure, 2: partition wall, 3: cell, 4: center of cross-section, 5: outer peripheral wall, 5a, 5b: point on outer peripheral wall, 6: line extending in a direction of 45° with respect to the longitudinal direction of partition walls from the center of a cross-section, 7: outer peripheral portion, 10: extrusion face

BEST MODE FOR CARRYING OUT THE INVENTION

Embodiments of the present invention are hereinafter described specifically on the basis of drawings. However, the present invention is by no means limited to the following embodiments, and it should be understood that modification and improvement can appropriately be added on the basis of knowledge of those skilled in the art. Incidentally, "cross-section" means a cross-section perpendicular to an axial direction of a honeycomb structure unless stated specifically.

Figures 1A, 1B:
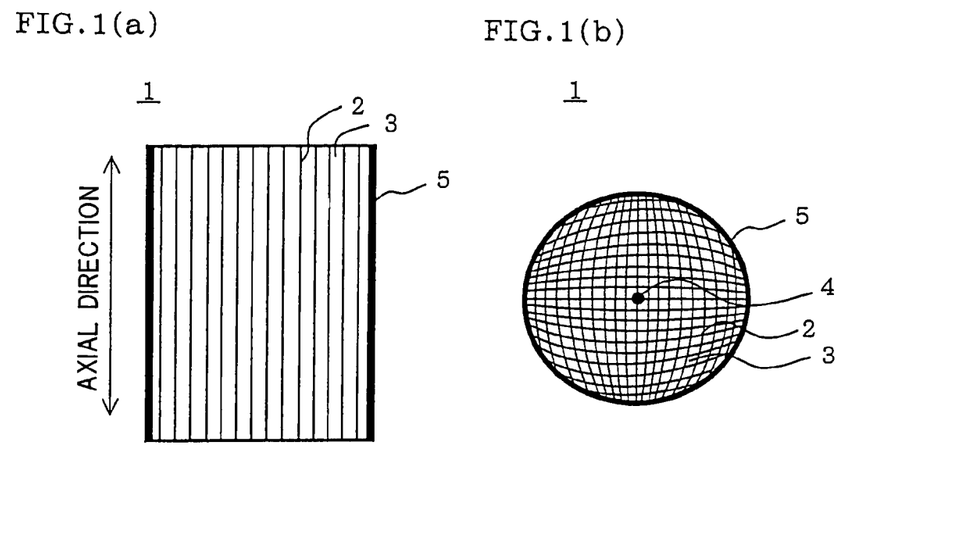
FIG. 1(a) is a schematic parallel cross-sectional view showing a cross-section parallel to the axial direction.
FIG. 1(b) is a schematic cross-sectional view.

FIGS. 1(a) and 1(b) are views schematically showing the first embodiment of a honeycomb structure of the present invention. FIG. 1(a) is a schematic parallel cross-sectional view showing a cross-section parallel to the axial direction, and FIG. 1(b) is a schematic cross-sectional view. A honeycomb structure 1 of the embodiment shown in FIGS. 1(a) and 1(b) is provided with a plurality of partition walls 2 partitioning a plurality of cells 3 extending in the axial direction. Further, as shown in FIG. 1(b), the partition walls 2 show a curved shape protruding toward outside (the direction toward the outer peripheral wall 5) from the center 4 of a cross-section (hereinafter referred to as a "positive curve"). The following effect is obtained by having partition walls having a positive curve.

As the partition walls have a positive curve, the central portion has a lower cell density than the outer peripheral portion. Therefore, the central portion has a higher opening ratio than the outer peripheral portion. A honeycomb structure having a relatively high cell density has large pressure loss, though it shows high catalyst purification performance. In such a honeycomb structure, pressure loss can be lowered because exhaust gas can easily flow in the central portion by providing the partition walls having a positive curve. In addition, in a filter mainly having a cell structure having relatively low cell density, there arises a problem that the inlet in cell opening portions is clogged with the accumulation of particulate matter. Even in such a honeycomb structure, the cell opening area is increased in the central portion of the honeycomb structure by providing partition walls having a positive curve, and clogging with particulate matter can be avoided even in the case of having a large amount of particulate matter in exhaust gas.

Figure 2:
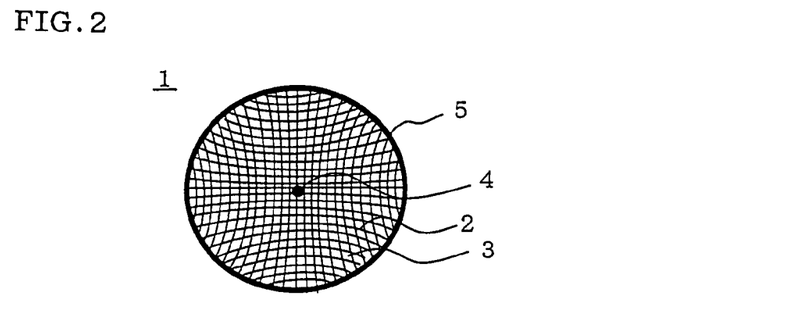
FIG. 2 is a cross-sectional view schematically showing the second embodiment of a honeycomb structure of the present invention.

FIG. 2 is a cross-sectional view schematically showing the second embodiment of a honeycomb structure of the present invention. A honeycomb structure 1 of the embodiment shown in FIG. 2 has a curved shape protruding toward the center 4 of a cross-section from outside (the direction toward the outer peripheral wall 5) (hereinafter referred to as a "negative curve"). The following effects are obtained by having partition walls having a negative curve.

The central portion has a higher cell density than the outer peripheral portion because of the negative curve of the partition walls in a cross-section perpendicular to the axial direction. Therefore, the central portion has a lower opening ratio than the outer peripheral portion. A honeycomb structure having a relatively low cell density invites deteriorated catalyst purification performance though it has small pressure loss. In such a honeycomb structure, catalyst purification performance can be improved because the central portion has a higher cell density than the outer peripheral portion by providing the partition walls having a negative curve. In addition, in a square cell structure, strength of the honeycomb structure is improved since it has large resistance against outer pressure in a diagonal direction. In a filter, a surface area of partition walls in the central portion is increased, and a pressure loss upon accumulation of particulate matter can be lowered.

Further, the following effects are obtained with regard to strength of a honeycomb structure. When there is a remarkable large deformation is present in a partition wall, cells are generally in a fracture mode (relatively low strength fracture because of a local fracture mode) depending on bending stress of the partition wall. On the other hand, the partition walls having noticeable large deformations becomes fracture mode (relatively high strength fracture because of a whole structural fracture mode) depending upon a buckling stress which is originally equipped with honeycomb structure. The case of a honeycomb structure manufactured by coating the outer periphery with a coating material for forming the outer peripheral wall after removing the deformation in a partition wall in the outer peripheral portion caused upon extrusion forming of a honeycomb structure (e.g., a large-sized carrier and a DPF) and the case that influence of the deformation can be ignored because of the very thick partition wall in comparison with the deformation of a partition wall (e.g., a DPF or an industrial honeycomb structure) tend to have a fracture mode depending on buckling stress.

Figure 3:
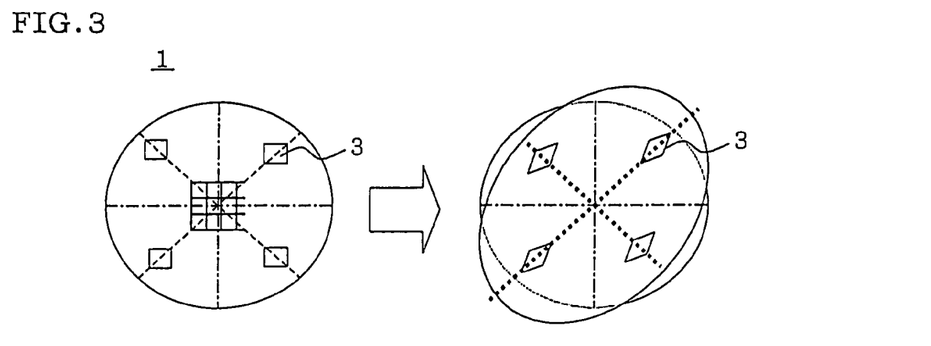
FIG. 3 is a view schematically showing general action of fracture of a honeycomb structure in a fracture mode depending on buckling stress.

FIG. 3 is a view schematically showing general action of fracture of a honeycomb structure in a fracture mode depending on buckling stress in the case of a square cross-sectional shape of cells. As shown in FIG. 3, in this fracture mode, generally, a honeycomb structure is easily affected by force in a direction of 45° with respect to the longitudinal direction of partition walls in a cross-section, that is, force in a diagonal direction of the cells 3, and there are many cases of fracture due to deformation in this direction when an excessive isotropic load is applied.

Figure 4:
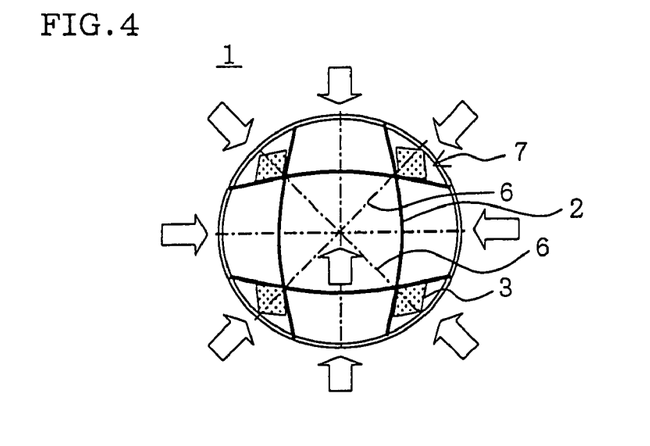
FIG. 4 is a schematic view showing strength characteristics in the first embodiment of a honeycomb structure of the present invention.

In a honeycomb structure provided with partition walls having a positive curves (first aspect of the embodiment), as shown in FIG. 4, cells located in the vicinity of the outer peripheral portion 7 on a line 6 extending in a direction of 45° with respect to the longitudinal direction of partition walls from the center of a cross-section has a sharpened shape in a direction of 90° with respect to the line 6, that is, a shape deformed into a collapsed rhomb in the direction of the line 6. When such a honeycomb structure is subjected to an excessive isotropic load, rhombic cells in the vicinity of the outer peripheral portion 7 have a collapsed shape, which is not preferable in view of isostatic strength. However, the cells are smoothly deformed in the whole honeycomb structure, and partition walls do not have excessive bending. Therefore, a remarkable decrease in isostatic strength can be suppressed. In the case that a buckling primary deformation mode where cells are collapsed in an arbitrary direction of 45° (direction of the line 6) when it is subjected to an excessive isotropic load is supposed, rhombic cells in the outer peripheral portion in the other 45° direction act against primary mode deformation. Therefore, a sharp decrease in isostatic strength can be avoided. In addition, isostatic strength can be improved by making the partition walls of the cells in the outer peripheral portion thicker than the partition walls of the inner cells.

Figure 5:
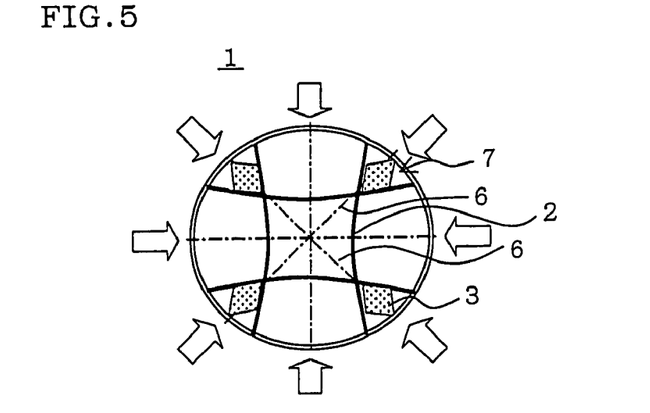
FIG. 5 is a schematic view showing strength characteristics in the second embodiment of a honeycomb structure of the present invention.

In a honeycomb structure provided with partition walls having a negative curve (second aspect of the embodiment), as shown in FIG. 5, cells located in the vicinity of the outer peripheral portion 7 on the line 6 extending in a direction of 45° with respect to the longitudinal direction of partition walls from the center of a cross-section form cells deformed in a shape sharpened toward the direction of the line 6, that is, in a rhombic shape collapsed in a direction of 90° with respect to the line 6. Therefore, since such rhombic cells in the outer peripheral portion are hardly collapsed when they are subjected to an excessive isotropic load, isostatic strength is improved. In addition, though the whole honeycomb structure are in a compression stress field under an isotropic load, a central portion of the honeycomb structure is in the tensile stress field due to thermal expansion in the case that a honeycomb structure is heated. In this case, since partition walls having a negative curve have high tolerance against tensile stress, thermal shock resistance of the honeycomb structure is improved.

In a square cell structure, a relation between the outer diameter (D45) of a honeycomb structure in a diagonal direction of a cell (e.g., direction of the line 6 in FIG. 4) and the outer diameter (D90) in a longitudinal direction of partition walls is different between a honeycomb structure having partition walls having a positive curve (first aspect of the embodiment) and a honeycomb structure having partition walls having a negative curve (second aspect of the embodiment). It tends to be D90>D45 in the first aspect of the embodiment and D90<D45 in the second aspect of the embodiment. Because of this, in the first aspect of the embodiment, a clearance upon canning in a diagonal direction is in an increasing direction, and a stress at facing surface upon canning is also reduced.

In the first and second embodiments, when a curvature of partition walls is too low, effects of the present invention may not be exhibited sufficiently. Therefore, the average curvature (Wav) is preferably 0.6 mm or more, more preferably 1.0 mm or more. In addition, a relation (Wav/P) between the average curvature and the cell pitch (p) is preferably 1.2 mm/mm or more, more preferably 1.5 mm/mm or more. On the other hand, when the curvature is too high, a local fracture is prone to be caused because deformation of cells located in the outer peripheral portion of a honeycomb structure becomes too large, and probability of low strength fracture becomes high. Therefore, it is preferable to avoid an excessive curve. Since a limit of a curvature changes depending on a size of a honeycomb, material, cell shape, partition wall thickness, and cell pitch, it can suitably be obtained experimentally based on them. Generally, the average curvature (Wav) is preferably 15 mm or less, and more preferably 10 mm or less. The relation (Wav/P) between the average curvature and the cell pitch (p) is preferably 5 mm/mm or less, more preferably 3 mm/mm or less. Incidentally, the average curvature means the average value of width (Wn) of the maximum deviation of each of the consecutive partition walls (n) from a straight line as shown in FIG. 6, and the average curvature Wav in the case that a honeycomb structure is provided with 1 to n partition walls is expressed by the following formula:

$$Wav=(W1+W2+W3+\ldots+Wn)/n$$

Figure 6:
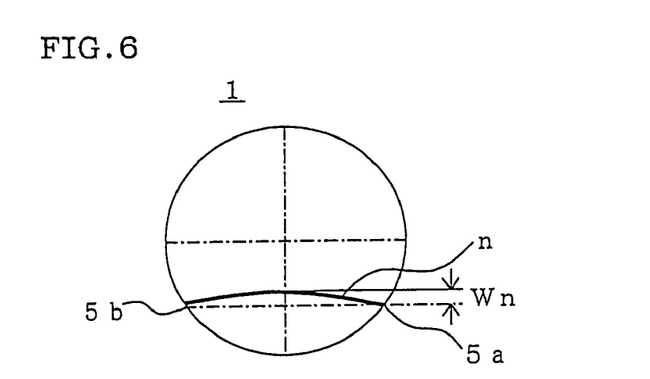
FIG. 6 is a schematic view showing a curvature of a honeycomb structure of the present invention.
Figure 7:
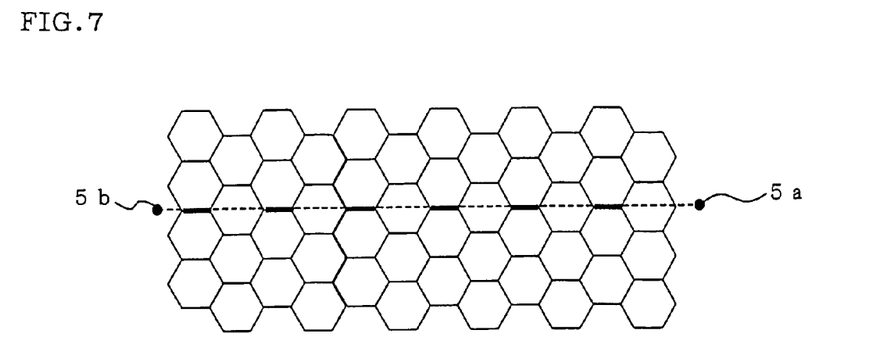
FIG. 7 is a schematic view showing a curvature of a honeycomb structure of the present invention.

In the case that a basic shape of a cross-section of a cell is a triangle, a rectangle, or the like, the partition walls 2 are continuous from one point 5a on the outer peripheral wall to another point 5b on the outer peripheral wall to form a smooth line, that is, a line without a bent point in a cross-section of a honeycomb structure as shown in FIG. 6. In the above definition of the curvature, partition walls forming one line continuous from one point 5a on the outer peripheral wall to another point 5b on the outer peripheral wall without a bent point are defined as a consecutive partition wall n, and a curvature can be determined from a width of deviation of the line which the consecutive partition wall n forms from the straight line connecting 5a and 5b. In addition, in the case that a basic shape of a cross-section of a cell is a hexagon, or the like, sometimes, partition walls do not form a smooth line continuous from one point on the outer peripheral wall to another point on the outer peripheral wall. In this case, as shown in FIG. 7, partition walls forming a broken line continuous from one point 5a on the outer peripheral portion to another point 5b on the outer peripheral portion without a bent point are defined as a consecutive partition wall 2, and a curvature can be determined from a width of deviation of the line which the consecutive partition wall 2 forms from the straight line connecting 5a and 5b. In the case of a cell having a circular cross-section, there can be drawn a line continuous from a point on the outer peripheral wall to another point on the outer peripheral wall without a bent point on the partition walls. The partition walls forming this line are defined as a consecutive partition wall, and a curvature can be determined from a width of deviation of the line which the consecutive partition wall forms from the straight line connecting the above two points. The same manner can be taken in other polygonal cells, oval cells, or a combination of these cells. From another viewpoint, the present invention is to change the conventional cell pattern where cells form lines in series into the cell pattern where cells form curved lines. That is, a line formed by combining the centers of the cross-section of the cells lining up in a row in a conventional honeycomb structure is made to be a curved line. By having, in at least a part, a cell pattern where cells are arranged so that the line connecting the centers of the cross-section of cells lining up in a row may curve, a honeycomb structure having the aforementioned effects can be obtained.

Figure 8:
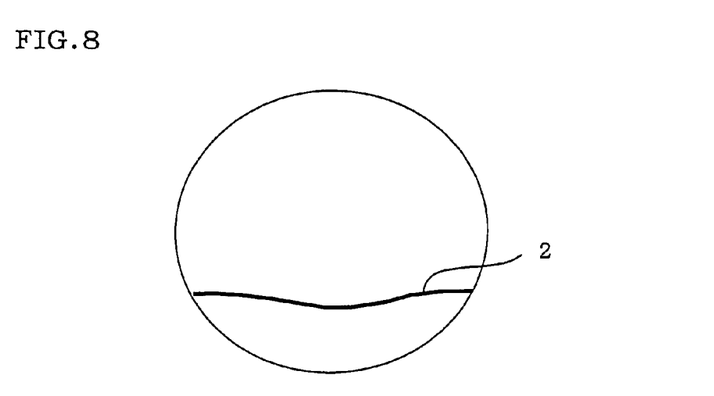
FIG. 8 is a cross-sectional view schematically showing another mode for curvature of partition walls.

In the first and second embodiments, all the partition walls are not required to form a curve, and at least a part of consecutive partition walls may be curved. In order to sufficiently obtain effects of the present invention, generally, it is preferable that partition walls of 25% by area or more with respect to the whole partition walls in a cross-section of a honeycomb structure have a curve, and it is more preferable that partition walls of 50% by area or more have a curve. Though it is, of course, possible according to the present invention to give a curve only in a locally narrow region, it is not preferable when, for example, reduction in pressure loss is aimed because contribution to reduction in pressure loss is lowered in a curved region with respect to the whole pressure loss in the honeycomb structure. When the curvature is raised in a narrow range, it increases change in curvature due to a curve of partition walls. This causes stress concentration in this range, and buckling fracture or thermal stress fracture of partition walls is prone to be caused. By forming a curve in a wide range, change in curvature becomes small, and buckling fracture and thermal stress fracture can be avoided. Though consecutive partition walls may have a curve of a certain curvature, they may have a curve of a different curvature. Particularly, by making a curvature of partition walls in the vicinity of the outer peripheral wall smaller than that of partition walls in the central portion as shown in FIG. 8, excessive deformation of partition walls in a portion where the partition walls 2 abut on the outer peripheral wall is suppressed, and stress concentration can be suppressed.

Though there is no particular limitation on a basic shape of a cross-section of a cell of a honeycomb structure, it is preferably one of a triangle, a square, a hexagon, and a circle from the viewpoint of manufacture. One of the shapes may be employed alone, or a combination of some of the shapes may be employed. Of these, a square basic shape is particularly preferable. There is no particular limitation on a cross-sectional shape of a honeycomb structure, and any shape may be employed, such as an ellipse, an oval, a polygonal shape of an almost triangle shape or an almost square shape, or the like.

In the case that a function as a filter is imparted to a honeycomb structure, an end portion of a cell is plugged as a plugged portion. Though plugged portions are generally formed in a checkered-flag pattern, there is no limitation on a pattern for plugging. For example, the pattern may be in a raw, in a concentric circle, or in a radial manner, and various kinds of patterns may be employed depending on a cell shape.

A material for a honeycomb structure may suitably be chosen from various kinds of ceramic materials such as cordierite, alumina, mullite, lithium aluminum silicate, aluminum titanate, titania, zirconia, silicon nitride, aluminum nitride, and silicon carbide, various kinds of heat resisting metal materials such as stainless steel, and various kinds of absorbing materials such as activated charcoal, silica gel, and zeolite. They may be used alone, or a composite material thereof may be used.

Since a honeycomb structure can be obtained depending on a structure of a extrusion die as long as the material can be subjected to extrusion forming besides the above materials, similar effects can be expected with a structure having partition walls whose surface is coated with a material prepared by dispersing different material particles or fibers in the aforementioned material or a polymer material such as resin after extrusion forming.

When a honeycomb structure using these materials is used as a filter for removing particulate matter, the partition walls preferably have a porosity of 45 to 80%. In this case, the honeycomb structure preferably has a partition wall thickness of about 0.20 to 1.20 mm and a cell density of about 50 to 600 cpsi (cells/inch$^2$). In addition, by forming a protrusion and a depression on a surface of a wall, particulate matter removing ability can further be improved. Further, by loading a catalyst on partition walls, regeneration of a honeycomb structure by combustion of particulate matter can be supported.

A honeycomb structure of the present invention is suitable also for a three way catalyst carrier and used as, for example, a catalyst carrier for purifying automobile exhaust gas by loading a catalyst on a surface of the partition walls or on the surface of pores in the partition walls of a honeycomb structure. In this case, the honeycomb structure preferably has a partition wall thickness of about 0.010 to 0.120 mm and a cell density of about 200 to 3000 cpsi (cells/inch$^2$). Because the partition walls are formed to be relatively thin for lowering heat capacity, strength is lowered. Therefore, it is preferable that the partition walls have a porosity of 5 to 45%.

As a method for manufacturing a catalyst carrier for purifying automobile exhaust gas, there may be employed any of methods such as a method where a catalyst body is obtained by loading a catalyst component on partition walls of a honeycomb structure, a method where a honeycomb structure itself is formed of a catalyst component, and a combination thereof. Generally, as a catalyst for purifying automobile exhaust gas, there are a hybrid type catalyst where γ-alumina having high specific surface area is coated on a surface of partition walls of a cordierite honeycomb structure, followed by loading a noble metal component on an alumina layer, and a solid type catalyst where a honeycomb structure is constituted by titanium dioxide or the like as a catalyst for purifying exhaust gas from a fixed generation source.

A catalyst component is generally constituted by a noble metal such as platinum, palladium, and rhodium, or a combination of a vanadium oxide, ceria, yttria, zirconia, titania, alkali metals, perovskite based composite, a tourmaline component, etc. The catalyst is generally at least one selected from the group consisting of a three way catalyst which oxidizes and reduces hydrocarbons, carbon monoxide, and nitrogen oxides; an oxidizing catalyst which oxidizes hydrocarbons, NO, SOF, carbon and components; a NOx reducing catalyst which reduces NOx; and a catalyst which decomposes and removes sulfide, volatile organic compounds gas (VOC) component, and dioxins; or a compound thereof. Any of the catalyst components is required to accelerate a contact reaction between exhaust gas and a catalyst and to activate the catalyst at an early stage, and it is effective to use above described honeycomb structure as a catalyst carrier.

By using a honeycomb structure having a catalyst loaded thereon, a catalytic converter for purifying exhaust gas is provided. There is also provided a catalytic converter system for purifying exhaust gas where such catalytic converters for purifying exhaust gas and catalytic converters where a catalyst is loaded on general honeycomb structures are alternately disposed in series. Of course, one converter may have both a honeycomb structure having curved partition walls with a catalyst being loaded thereon and a conventional honeycomb structure with a catalyst being loaded thereon without being divided into a plurality of converters.

A honeycomb structure of the present invention can be applied to the following exhaust gas purification system. A honeycomb structure is generally positively charged to collect electrically negatively charged particulate matter. The honeycomb structure may be negatively charged in case of target to be collected. As an exhaust gas purification system using a similar honeycomb structure, there is a system for collecting particulate matter by the use of non-thermal plasma, or microwave discharge plasma, and it is also possible to apply a honeycomb structure of the present invention to such a system. As another example of application of a honeycomb structure of a present invention, there is provided a catalyst carrier for a reformer for a fuel cell system or for a fuel cell body.

Figure 9:
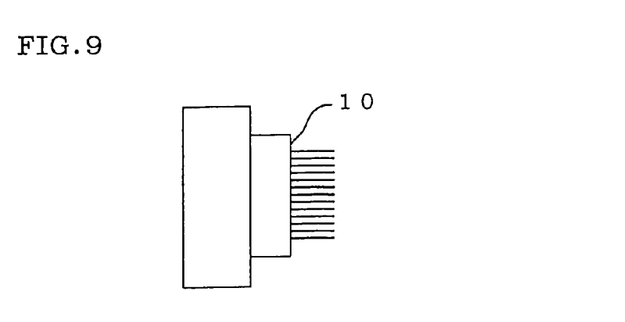
FIG. 9 is a schematic view showing a method for manufacturing a conventional honeycomb structure.
Figure 10:
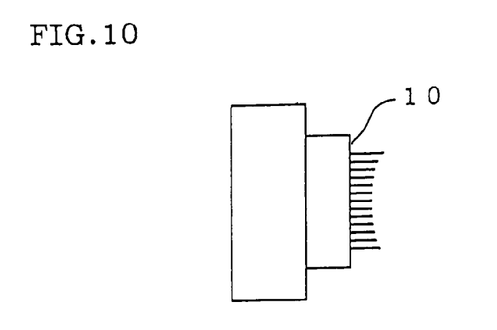
FIG. 10 is a schematic view showing an example of a method for manufacturing a honeycomb structure of the present invention.
Figure 11:
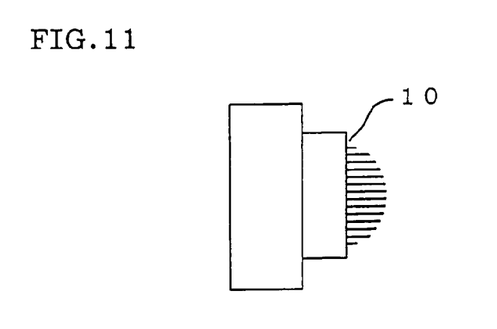
FIG. 11 is a schematic view showing another example of a method for manufacturing a honeycomb structure of the present invention.

Next, a method for manufacturing a honeycomb structure of the present invention as shown in the first and second embodiments is described. When a honeycomb structure is subjected to extrusion forming, extrusion has conventionally been performed so that extrusion speed for extruding a raw material from an extrusion face 10 may be uniform as a whole as shown in FIG. 9. In the present invention, as shown in FIGS. 10 and 11, a raw material is extruded at a different extrusion speed between in the central portion and in the outer peripheral portion of the extrusion face 10. Thus, by performing extrusion at a different extrusion speed, partition walls having a positive or a negative curve can be formed. As shown in FIG. 10, when extrusion speed in the central portion is made lower than that in the outer peripheral portion, partition walls having a negative curve can be formed. Since partition walls in the vicinity of the outer peripheral wall are deformed in this pattern (rolled pattern), it is preferable to avoid an excessive difference in extrusion speed since it causes excessive bending of partition walls. On the other hand, as shown in FIG. 11, when extrusion speed in the central portion is made higher than that in the outer peripheral portion, partition walls having a positive curve can be formed. Here, the central portion means the portion holding an area of 50% of a cross-sectional area of the whole honeycomb structure with the center of the cross-section of the honeycomb structure as the center. The outer peripheral portion means the portion holding an area of 50% equally from the outer periphery of the honeycomb structure.

When partition walls are wholly curved from one point on the outer peripheral wall to another point on the outer peripheral wall of a honeycomb structure, it is preferable particularly in a integrally formed honeycomb structure (a honeycomb structure where the partition walls and the outer peripheral wall are integrally formed and fired without removing the outer peripheral wall) to make a curve small in the vicinity of the outer peripheral wall. Since the outer peripheral wall and the partition walls are integrally formed by extrusion in a integrally formed honeycomb structure, when partition walls are wholly curved from a point on the outer peripheral wall to another point on outer peripheral wall, partition walls are sometimes deformed excessively (bending of partition walls) in the vicinity of a contact portion between the outer peripheral wall and partition walls. Therefore, in such an excessively deformed portion, local fracture is prone to be caused due to external force from the outer peripheral surface of the outer peripheral wall. A smooth curve of cells without excessive bending enables to maintain strength of the honeycomb structure to the same extent as to a conventional structure.

Figure 12:
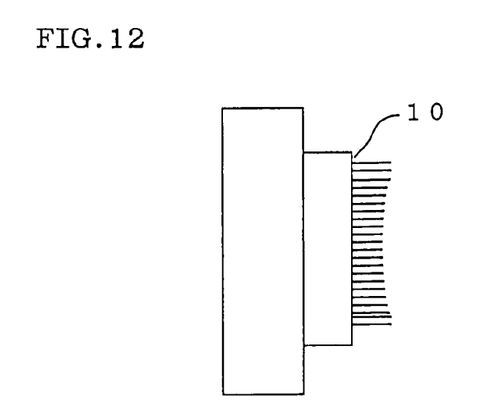
FIG. 12 is a schematic view showing still another example of a method for manufacturing a honeycomb structure of the present invention.
Figure 13:
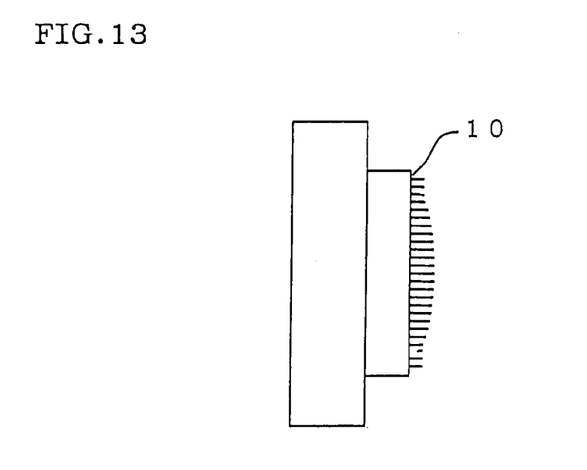
FIG. 13 is a schematic view showing yet another example of a method for manufacturing a honeycomb structure of the present invention.

As shown in FIGS. 12 and 13, excessive deformation of partition walls in the vicinity of a contact portion between the outer peripheral wall and partition walls can be suppressed by changing an extrusion speed inside the vicinity of the outer peripheral wall with an extrusion speed in the vicinity of the outer peripheral wall being fixed. When a partition wall is excessively bent in the vicinity of a contact portion between the outer peripheral wall and partition walls, the outer peripheral portion of the honeycomb structure is removed by machining to remove a bent portion, and a new outer peripheral wall is applied to manufacture a honeycomb structure without an excessively bent partition wall.

When a honeycomb structure is formed by extrusion forming, generally, an extrusion die having slits for forming partition walls and back holes communicating with the slits and introducing a raw material into the slits is attached to a tip end of an extruder for extrusion forming. Extrusion speed can be controlled by adjusting resistance of the back holes or by attaching a resistance screen (such as a metal mesh) on the backside (extruder side) of the extrusion die. When the resistance screen is attached in the central portion on the backside of the extrusion die, there is given an extrusion pattern at a high extrusion speed at the outer peripheral portion as shown in FIG. 10. When the resistance screen is attached in the outer peripheral portion on the backside of the extrusion die, there is given an extrusion pattern at a high extrusion speed at the central portion as shown in FIG. 11. A position and a range of a region where the resistance screen is attached and a degree of resistance of the screen is suitably determined so as give a predetermined curve to cells.

As another method of changing an extrusion speed depending on a portion, there is a means to adjust a speed at the central portion and at the peripheral portion in a cylinder of an extruder. Specifically, there is a means to adjust a speed depending on a reduction of the cylinder or an enlargement angle. The speed can be controlled also by changing density or hardness of the raw material between at the central portion and at the outer peripheral portion. Extrusion forming can be performed by the use of a ram extruder, a biaxial screwed continuous extruder, or the like.

Incidentally, it is also possible to form a curve on partition walls by using difference in dry shrinkage or firing shrinkage after forming a conventional honeycomb structure without having a curve of partition walls. However, it is preferable to form a curve on partition walls by extrusion forming as described above because it can be controlled with good reproducibility upon manufacturing.

EXAMPLES

Comparative Example 1

To a cordierite forming raw material containing talc, kaolin, and alumina as the main raw material were mixed water and a binder, and the mixture was kneaded to prepare a forming raw material, which were put in an extruder having a conventional extrusion die and subjected to extrusion forming to obtain a honeycomb formed body. After being dried, the honeycomb formed body was cut to have a predetermined length, and cells were alternately plugged, followed by firing. The outer peripheral wall and partition walls corresponding with several cells from the outermost periphery were removed by grinding, a ceramic coating material was applied on the outer periphery to form the outer peripheral wall. Thus, a honeycomb structure having a following constitution was obtained.

Cross-sectional shape of a cell: square
Partition wall thickness: 0.3 mm
Standard cell density: 280 cpsi (43 cells/cm$^2$)
External shape of honeycomb structure: column (outer diameter: 267 mm, length: 305 mm)
Porosity of 60%, mean pore diameter of 19 µm
Average thermal expansion coefficient in an axial direction at 40 to 800° C.: about $0.4 \times 10^{-6}$/° C.

Example 1

Figure 14:
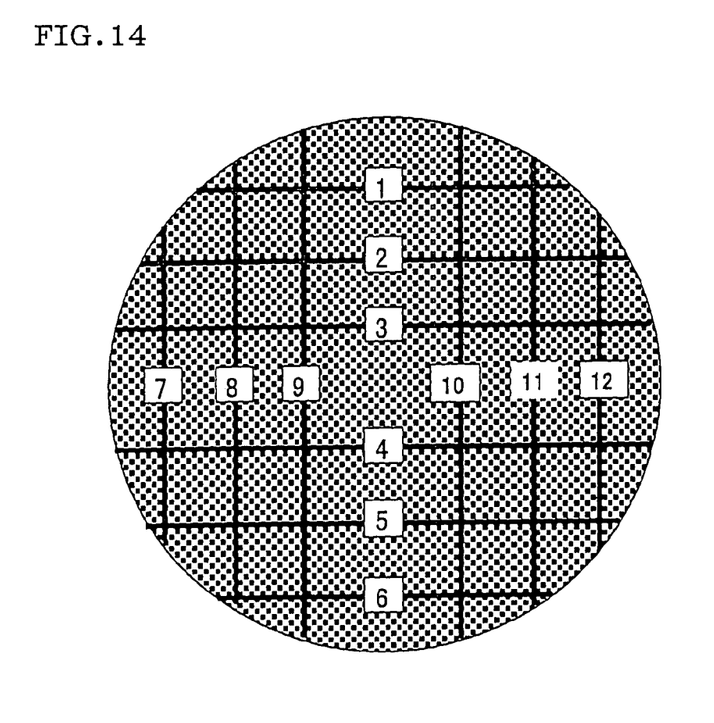
FIG. 14 is a schematic view showing points for measuring a curvature in Examples.

A honeycomb structure was obtained in the same manner as in Comparative Example 1 except that the aforementioned resistance screen was attached on the outer peripheral portion on the backside of an extrusion die. Since the honeycomb structure of Example 1 has partition walls having a positive curve, the honeycomb structure has a cell density of 250 to 270 cpsi in the central portion and 290 to 310 cpsi in the outer peripheral portion. The curve was positive with an average curvature of 2.4 mm. Points for measurement of curvature are shown in FIG. 14, and curvatures obtained at the points are shown in Table 1.

TABLE 1

| Point for measurement | Curvature |
|---|---|
| 1 | 3.0 |
| 2 | 2.9 |
| 3 | 1.1 |
| 4 | 1.4 |
| 5 | 2.5 |
| 6 | 2.4 |
| 7 | 3.6 |
| 8 | 3.7 |
| 9 | 2.0 |
| 10 | 1.2 |
| 11 | 2.5 |
| 12 | 2.4 |
| Ave | 2.4 |
| Std | 0.8 |
| Max | 3.7 |
| Min | 1.1 |

Exhaust gas at about 200° C. and containing particulate matter was generated with a particulate matter generator having a burner using light oil as a fuel, and the exhaust gas was introduced into each of the honeycomb structures of Example 1 and Comparative Example 1 to compare a pressure loss and a clogged condition with particulate matter in at inlet of each cell. A honeycomb structure of Example 1 showed a pressure loss of about 5% reduction in comparison with a honeycomb structure of Comparative Example 1. In addition, a condition of clogging progress at an inlet of each cell by accumulation of particulate matter was also improved.

A thermal shock resistance test was performed on the basis of a method according to JASO Standard M505-87. First, the honeycomb structure at room temperature was put in an electric furnace having a predetermined temperature higher than room temperature and maintained for 60 minutes, and then the honeycomb structure was taken out on a firebrick. Then, an external appearance was observed, and the outer peripheral portion of a honeycomb structure was slightly tapped with a metal stick to confirm presence/absence of a crack. In the case that no crack was found and that no dead metal sound was heard, the honeycomb structure was given a passing mark. Next, the same test was repeated every time when temperature in the electric furnace was raised by 50° C. in order until the honeycomb structure failed the test. For example, when the honeycomb structure failed the test at a temperature of room temperature plus 550° C., its thermal shock resistance was determined as a temperature difference of 500° C. A honeycomb structure of Example 1 showed thermal shock resistance on a level with that of Comparative Example 1.

Comparative Example 2 and Example 2

A honeycomb structure of Comparative Example 2 having the following constitution was obtained in the same manner as in Comparative Example 1. A honeycomb structure of Example 2 was obtained in the same manner as in Comparative Example 2 except that a resistance screen was arranged in the peripheral portion on the backside of the extrusion die. The honeycomb structures were subjected to the same test as in Comparative Example 1 and Example 1. As a result, the same effect as Example 1 was obtained also in the honeycomb structure in Example 2. The curvature of the honeycomb structure in Example 2 was measured in the same manner as in Example 1, and it was 1.1 mm on the average.

Cross-sectional shape of a cell: square
Partition wall thickness: 0.2 mm
Standard cell density: 600 cpsi (93 cells/cm$^2$)
External shape of honeycomb structure: column (outer diameter: 144 mm, length: 152 mm)
Porosity: 76%
Mean pore diameter: 12 µm Comparative Example 3

A honeycomb structure of Comparative Example 3 was obtained in the same manner as in Comparative Example 1 except that an integrally formed honeycomb structure having the following constitution was obtained without removing the outer peripheral wall and partition walls in the vicinity of the outer peripheral wall.

Cross-sectional shape of a cell: square
Partition wall thickness: 0.37 mm
Standard cell density: 250 cpsi (39 cells/cm$^2$)
External shape of honeycomb structure: column (outer diameter: 144 mm, length: 152 mm)
Porosity: 75%
Mean pore diameter: 12 µm
Average thermal expansion coefficient in an axial direction at 40 to 800° C.: about $0.5 \times 10^{-6}$/° C.

Example 3

A honeycomb structure was obtained in the same manner as in Comparative Example 3 except that a resistance screen was arranged in the central portion on the backside of the extrusion die. Since the honeycomb structure of Example 3 has partition walls having a negative curve, the honeycomb structure has a cell density of 260 to 280 cpsi in the central portion and 230 to 240 cpsi in the outer peripheral portion. Warp degrees were measured in the same manner as in Example 1. Warp degrees obtained at the same measurement points as in Example 1 are shown in Table 2. The average curvature was 1.0 mm.

TABLE 2

| Point for measurement | Curvature |
| --- | --- |
| 1 | 1.2 |
| 2 | 1.3 |
| 3 | 0.7 |
| 4 | 0.5 |
| 5 | 1.1 |
| 6 | 0.6 |
| 7 | 0.8 |
| 8 | 0.9 |
| 9 | 0.8 |
| 10 | 1.4 |
| 11 | 1.4 |
| 12 | 1.4 |
| Ave | 1.0 |
| Std | 0.3 |
| Max | 0.5 |
| Min | 1.4 |

The honeycomb structures of Comparative Example 3 and Example 3 were subjected to an iostatic fracture strength test based on a method according to an automobile standard (JASO Standard) M505-87 issued by Society of Automotive Engineers of Japan, Inc. In this test, a honeycomb structure was put in a cylindrical rubber container and covered with an aluminum board lid to perform an isotropic press compression test in water, which simulated compression load weighting in the case that a honeycomb structure held in a can of a converter is grasped at its outer peripheral surface. Isostatic strength is shown by a pressure value when a honeycomb structure is fractured. A catalytic converter for purifying automobile exhaust gas generally employs a canning structure where a honeycomb structure is grasped at its outer peripheral surface, and, of course, it is preferable that isostatic fracture strength is strong for canning. A honeycomb structure of Example 3 showed isostatic fracture strength higher by about 10% than that of a honeycomb structure of Comparative Example 3. In addition, as a result of the aforementioned thermal shock resistance test, Example 3 showed about 30° C. safe temperature improvement in comparison with Comparative Example 3.

Comparative Example 4

A honeycomb structure for a three way catalyst carrier of Comparative Example 4 was obtained in the same manner as in Comparative Example 1 without removing the outer peripheral wall and partition walls in the vicinity of the outer peripheral wall and without plugging.
Cross-sectional shape of a cell: square
Partition wall thickness: 0.09 mm
Standard cell density: 400 cpsi (62 cells/cm$^2$)
External shape of honeycomb structure: column (outer diameter: 100 mm, length: 100 mm)
Thickness of outer peripheral wall: 0.25 mm
Porosity (before loading a catalyst): about 35%
Average thermal expansion coefficient in an axial direction at 40 to 800° C.: about $0.4 \times 10^{-6}$/° C.

Example 4

A honeycomb structure was obtained in the same manner as in Comparative Example 4 except that a resistance screen was arranged in the outer peripheral portion on the backside of the extrusion die. Since a honeycomb structure of Example 4 had partition walls having a negative curve, the honeycomb structure had a cell density of 410 to 430 cpsi in the central portion and 380 to 390 cpsi in the outer peripheral portion. Warp degrees were measured in the same manner as in Example 1. The average curvature was 1.5 mm.

On the honeycomb structures of Comparative Example 4 and Example 4, γ-alumina was wash-coated to form a coat layer, on which a noble metal component such as a platinum, rhodium, and palladium was loaded on a catalyst body. By holding the catalyst body in a metal container using a ceramic fiber mat a catalytic converter was obtained. Regarding an amount of a catalyst (noble metal component) loaded, a loaded mass per unit capacity of a honeycomb structure was made to be the same. Since the honeycomb structures had the same size, a loaded amount was also the same. Each of the catalytic converters was mounted in a position right under an exhaust manifold of a vehicle carrying a gasoline engine of 2.3 liters with four cylinders and subjected to a purification performance test according a typical U.S. representative exhaust gas regulation mode, FTP-75. Incidentally, a catalytic converter was subjected to an aging treatment at 900° C. for 50 hours with another engine before this mode test. In a catalyst body of Example 4, sharp reduction in a discharge amount of hydrocarbon (HC), carbon monoxide (CO), and nitrogen oxides (NOx) was confirmed in comparison with a conventional catalytic body of Comparative Example 4.

With regard to a honeycomb structure of the present invention and a method for manufacturing the honeycomb structure, description has been made laying stress on a cordierite ceramic honeycomb structure having a square cross-section of cells, having good mechanical properties, etc., and generally employed in the market. However, it is needless to say that the present invention may be applied to a honeycomb structure having another cross-section of cells. That is, it is possible that all or a part of the partition walls are curved in a honeycomb structure having a triangular, hexagonal, or octagonal cross-section of cells. It is also possible to use a silicon carbide based, silicon nitride based, or aluminum titanate based material.

INDUSTRIAL APPLICABILITY

As described above, a honeycomb structure of the present invention can be used as a catalyst carrier for purifying exhaust gas from various internal combustion engines, a catalyst carrier for deodorizing, a filter for various filtration apparatuses, a heat exchanger unit, or a carrier for a chemical reactor such as a reforming catalyst carrier for a fuel cell. In addition, by a manufacturing method of the present invention, such a honeycomb structure can suitably be manufactured.

The invention claimed is:
1. A honeycomb structure comprising:
a plurality of cells extending in an axial direction; and
a plurality of partition walls partitioning the plurality of cells and defining walls of the cells, wherein, when the honeycomb structure is viewed in a cross-section substantially perpendicular to the axial direction, the cells have four curved walls, opposite walls of each cell curving generally in a same direction.
2. A honeycomb structure comprising:
a plurality of cells extending in an axial direction; and
a peripheral wall that surrounds the plurality of cells;
wherein, when the honeycomb structure is viewed in a cross-section substantially perpendicular to the axial direction:

a plurality of pairs of the cells, each pair sharing a partition wall, are arranged such that the shared partition walls are on a curved line, the curved line curving generally in only one direction.

3. A honeycomb structure according to claim 1, wherein the partition walls each has an average curvature Wav (mm) of $0.6 \leq Wav \leq 15$.

4. A honeycomb structure according to claim 2, wherein the shared partition walls each has an average curvature Wav (mm) of $0.6 \leq Wav \leq 15$.

5. A honeycomb structure according to claim 1, wherein a relation between the Wav (mm) and a cell pitch P (mm) is $1.2 \leq (Wav/P) \leq 5$.

6. A honeycomb structure according to claim 2, wherein a relation between the Wav (mm) and a cell pitch P (mm) is $1.2 \leq (Wav/P) \leq 5$.

7. A honeycomb structure according to claim 3, wherein a relation between the Wav (mm) and a cell pitch P (mm) is $1.2 (Wav/P) \leq 5$.

8. A honeycomb structure according to claim 4, wherein a relation between the Wav (mm) and a cell pitch P (mm) is $1.2 \leq (Wav/P) \leq 5$.

9. A method for manufacturing a honeycomb structure, comprising a step of forming a honeycomb formed body having partition walls partitioning a plurality of cells extending in an axial direction by extrusion-forming,
wherein extrusion-forming is performed at different extrusion speed between a central portion and an outer peripheral portion to form partition walls each having a curved shape in a cross-section perpendicular to the axial direction.

10. A honeycomb structure according to claim 1, wherein the two or more cells are adjacent cells along one of the partition walls.

11. A honeycomb structure according to claim 1, wherein the two or more cells include two cells that are separated by only one cell.

12. The honeycomb structure according to claim 1, wherein the curvatures of the opposite walls are convex with respect to a center point of the cross-section.

13. The honeycomb structure according to claim 1, wherein the curvatures of the opposite walls are concave with respect to a center point of the cross-section.

14. The honeycomb structure according to claim 1, wherein different partition walls have respectively different radii of curvature.

* * * * *